(12) United States Patent
Van Der Stratten

(10) Patent No.: US 9,877,496 B2
(45) Date of Patent: Jan. 30, 2018

(54) PIPING BAG FOR APPLYING FOODSTUFFS TO A SUBSTRATE

(75) Inventor: Jan Cornelis Van Der Stratten, Breda (NL)

(73) Assignee: ONE WAY PLASTICS B.V., Oosterhout (NL)

( * ) Notice: Subject to any disclaimer, the term of this patent is extended or adjusted under 35 U.S.C. 154(b) by 1636 days.

(21) Appl. No.: 12/162,289

(22) PCT Filed: Feb. 5, 2007

(86) PCT No.: PCT/NL2007/000032
§ 371 (c)(1),
(2), (4) Date: Feb. 26, 2009

(87) PCT Pub. No.: WO2007/089138
PCT Pub. Date: Aug. 9, 2007

(65) Prior Publication Data
US 2009/0188941 A1    Jul. 30, 2009

(30) Foreign Application Priority Data
Feb. 3, 2006 (NL) .................................. 1031061

(51) Int. Cl.
A23G 3/00        (2006.01)
B65D 35/00       (2006.01)
A23G 3/34        (2006.01)
A21C 15/00       (2006.01)
A23G 3/28        (2006.01)

(52) U.S. Cl.
CPC .......... *A23G 3/0097* (2013.01); *A21C 15/005* (2013.01); *A23G 3/28* (2013.01)

(58) Field of Classification Search
USPC .......................... 222/92–107; 428/35.2, 36.8
See application file for complete search history.

(56) References Cited

U.S. PATENT DOCUMENTS 279,555 A      6/1883   Fish
3,553,070 A *  1/1971   Sparks .......................... 428/215
(Continued)

FOREIGN PATENT DOCUMENTS

CH     206705      11/1938
DE     3412254     12/1984
(Continued)

OTHER PUBLICATIONS

M. Gilkes, Technical Data Sheet: TPR (Thermoplastic Rubber), Jan. 28, 2000, Issue: 01, Entire Document.*
Shore Hardness Scales, 2008, Smooth-On, Entire Document.*

*Primary Examiner* — Nicholas J Weiss
(74) *Attorney, Agent, or Firm* — Karl Bozicevic; Bozicevic, Field and Francis LLP

(57) ABSTRACT

The invention relates to a piping bag (1) for applying foodstuffs (18) to a substrate (2), this piping bag (1) comprising a bag of plastic foil material, which bag is provided with a filling opening (4) and a dispensing opening (6), and wherein at least one portion of an outer side of the bag (1) comprises a rubber composition. The invention also relates to a method for manufacturing a piping bag (128, 129), comprising of forming the piping bag by co-extrusion of at least one plastic (101, 102) and one rubber (103) composition, wherein the rubber composition forms an outer side (22) of the piping bag (1).

10 Claims, 2 Drawing Sheets

(56) References Cited

U.S. PATENT DOCUMENTS

Figure 1:
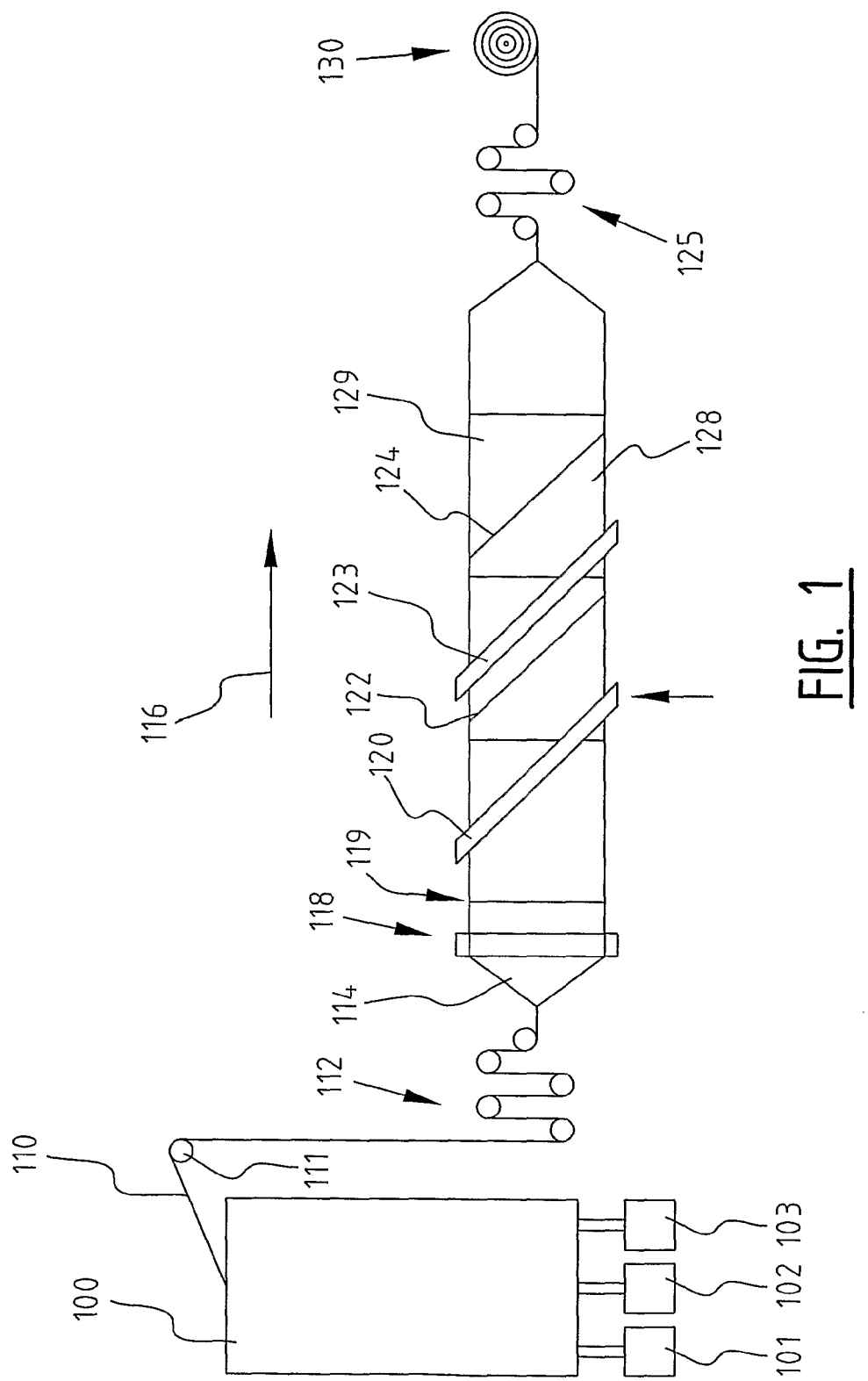

| | | | |
|---|---|---|---|
| 4,205,765 A * | 6/1980 | May | 222/107 |
| 4,488,918 A * | 12/1984 | Jofs | 156/79 |
| 4,536,454 A * | 8/1985 | Haasl | 428/516 |
| 5,066,290 A * | 11/1991 | Measells et al. | 604/408 |
| 5,090,597 A | 2/1992 | Johnson | |
| 5,508,051 A * | 4/1996 | Falla et al. | 426/392 |
| 6,127,009 A * | 10/2000 | Strassmann | 428/35.2 |
| 6,299,966 B1 * | 10/2001 | Bonke et al. | 428/173 |
| 7,775,716 B2 * | 8/2010 | Ejeblad | 383/105 |
| 2007/0051418 A1 * | 3/2007 | Rowles et al. | 138/137 |

FOREIGN PATENT DOCUMENTS

| | | |
|---|---|---|
| DE | 10206058 | 8/2003 |
| EP | 1 598 281 | 11/2005 |
| FR | 2871355 | 12/2005 |
| JP | 55-023061 | 2/1980 |
| JP | 55-130006 | 10/1980 |
| JP | 61-004743 | 1/1986 |
| JP | 01-228834 | 9/1989 |
| JP | 05-269846 | 10/1993 |
| JP | 11-005848 | 1/1999 |
| JP | 2000-053164 | 2/2000 |
| WO | 95/03984 | 2/1995 |
| WO | 2005/115162 | 12/2005 |

* cited by examiner

PIPING BAG FOR APPLYING FOODSTUFFS TO A SUBSTRATE

The present invention relates to a piping bag for applying foodstuffs to a substrate, this piping bag comprising a bag of plastic foil material.

The use of piping bags for applying foodstuffs to a substrate has been known for a long time. Mainly cotton piping bags were once used. These bags were however difficult to clean. In order to avoid this problem use is usually made at the moment of plastic piping bags which can be discarded after being used (once or a number of times). Piping bags are used a great deal in bakeries, for instance for applying whipped cream to a cake layer. An aesthetically attractive product can be prepared by arranging a nozzle of a determined form.

A drawback of the plastic piping bags now on the market is that they have a relatively smooth outer surface. Owing to this smooth outer surface it is relatively difficult for the user of the piping bag to dispense the correct quantity of foodstuff. This is because when the bag is squeezed in order to apply the foodstuff to a substrate, such as for instance a cake or an egg, it is very easy for the hand to slip, whereby too much foodstuff is dispensed onto the substrate. This occurs particularly when relatively fatty foodstuffs are being used, such as for instance whipped cream. There is further the risk of the bag slipping completely out of the hand, whereby the foodstuff from the bag ends up on the ground and becomes unusable. Bakeries therefore continue to use the cotton piping bags.

Known from EP 1 598 281 is a piping bag which attempts to solve this problem by making use of a rough three-dimensional outer surface. A layer comprising for instance flakes is arranged as separate additional layer on an outer side of the piping bag. The flakes provide a rough structure to the outer side for a better grip. The layer can also be arranged in structured manner, for instance with a pattern. One part of the outer side of the piping bag is hereby provided with a layer, and one part is not.

The present invention has for its object to provide an improved solution to the above stated problem.

A first aspect of the present invention relates to a piping bag for applying foodstuffs to a substrate, this piping bag comprising a bag of plastic foil material, which bag is provided with a filling opening and a dispensing end. Foodstuff can be arranged in the interior of the bag via the filling opening. The piping bag is grasped by the user on the outside. At least one portion of an outer side of the bag comprises a rubber composition.

Because the piping bag is provided with a rubber composition on the outside, a piping bag is obtained which also gives a good grip under working conditions. This prevents the piping bag slipping in the hand during use, whereby the desired quantity would not be dispensed. A quantity of foodstuff can thus be applied very precisely to a substrate, considerably enhancing the appearance of the prepared foodstuffs. The piping bag is prevented from slipping completely out of the hands of the user.

The piping bag has a dispensing end. This outer end, often an end of the bag tapering to a point, can be provided with an orifice or can still be closed. The closed outer end can be removed, whereby the content can be carried outside of the bag via the formed orifice.

The use of the rubber composition on an outer side results in an increase in the grip options due to the specific properties of rubber, particularly in respect of the use of the piping bag in the food industry. Foodstuffs often have a high fat content. The rubber composition has, up to a certain point, an absorbing capacity for such fatty substances, whereby the grip is not reduced, or hardly so, when the piping bag comes into contact with the fatty substance. In an environment with water the rubber outer side will also display more grip than a known outer side. Particularly when the piping bag is used for hot fillings such as potato puree, condensation on the outer side of the bag will occur as a result of the difference in temperature, but gripping of the bag will nevertheless remain readily possible.

A further advantage is that the rubber composition can be arranged uniformly on the outer side and that a grainy structure is unnecessary. The rubber composition is preferably an integral part of the outer side of the piping bag. A grainy rough structure could become detached, thereby contaminating the environment. Such contamination is absolutely undesirable in the food industry.

The rubber composition can become part of the piping bag in different ways. This can take place during manufacture of the foil materials of the piping bag, for instance by co-extrusion, although the rubber-containing composition can also be applied to the piping bag after forming of the foil and/or during further processing of the foil to form a piping bag.

It is noted that a cotton piping bag for multiple use is known from FR 2 871 355 which is provided with a rubber composition particularly on the inner side in order to increase the reusability and/or water-tightness of the piping bag. Because the cotton piping bag itself has a coarse and rough outer surface, the use of the rubber composition does not result in further improvement of the grip for the user.

The use of a rubber composition on the outer side of the piping bag otherwise has a surprising additional advantage. The edge of the filling mouth of the piping bag curls open because of the rubber composition on the outside. The bag is thus easier to fill. The bag is hereby also easier to use. During normal use the filling mouth is folded fully closed. The curled-open filling mouth is easier to fold.

In a preferred embodiment the rubber composition comprises a thermoplastic elastomer. Such substances are easy to process and have advantageous properties for use in the method for manufacturing the piping bags.

In a preferred embodiment the rubber composition is an apolar thermoplastic elastomer. Such elastomers can be readily processed with plastic foil materials forming the basis of the piping bag. Because use is made of apolar elastomers, a good adhesion is possible.

The rubber composition preferably has a density of 0.85-1.25 gr/cm$^3$, preferably between 0.87 and 1.15 gr/cm$^3$, and in particular preference between 0.88 and 1 gr/cm$^3$. At such a density the rubber composition acquires a softness which results in a considerable enhancement of grip.

Such a rubber composition has a Shore A hardness of 45 to 95, in particular 55 to 75. These are relatively soft materials. Such a hardness, in combination with the use of a rubber composition, surprisingly results in a considerable improvement in the grip of the piping bag, particularly during use in a fatty environment.

A layer with a rubber composition is preferably applied in the piping bag which has a thickness of 5 to 50 micron, preferably 8 to 30 micron, and in particular 10 to 20 micron. From 10 micron the layer has the advantageous rubber properties. The favourable gripping properties are hereby achieved, while a piping bag is obtained which is more flexible compared to the prior art.

A piping bag is particularly obtained through a combination of a rubber composition and one of the above stated materials, said thickness of the layer and said density, this combination giving better product properties. The piping bag according to the invention is in particular softer than known piping bags, whereby the piping bag is for instance easier to deform by the user, for instance for the purpose of folding back the filling opening of the piping bag for easy filling of the bag. In addition, the greater softness results in better grip. The piping bag according to the invention also lies better in the hand.

The thermoplastic elastomer of the rubber composition is particularly chosen from the group of styrene-based elastomers, such as styrene-ethylene/butylene-styrene (SEBS) as supplied by Kraton (tm) or styrene-ethylene/propylene-styrene as supplied by Kororai (tm) and/or styrene butylene styrene (SBS) or styrene isopropylene styrene (SIS). The elastomer can also be chosen from the group of thermoplastic vulcanized or non-vulcanized material (TPV/TPO) and comparable block copolymers which bring about the advantages of the invention. SEBS in particular is applied. TPV is supplied, among others, by Exxon Mobile. This material has favourable properties for the food industry, has good transparency and stable colour properties.

The rubber compositions particularly comprise, in addition to the rubber, one or a number of polyolefins, in particular polypropylene. Additional elements, such as small quantities of usual polymer additives such as process aids, colour means, lubricants, silica, talc or mineral oils/softeners, can further be incorporated in the rubber mixture.

SEBS and SBS are preferred according to the invention because they are transparent. SEBS is particularly preferred because of the stable colour properties. SBS can also be applied, in particular for applications of the piping bag where it is used once-only or for a limited period, for instance one day.

A particular advantage of the apolar thermoplastic elastomers is the fact that they do not have to be cross-linked after processing. This is particularly advantageous for performing a co-extrusion of the rubber composition with a plastic foil material. One or more types of granulate are co-extruded together with the rubber composition, whereby the basic material for the piping bag is obtained in one operational step. Further processing of the piping bag involves, among others, sealing and/or perforating and/or punching, and/or winding the formed piping bags onto a roll.

The rubber composition preferably comprises 20-90% rubber ((apolar) thermoplastic elastomer) and 80-10% other materials such as polyolefins, in particular polyethylene and/or polypropylene, white oils, softeners and the like. In a particular composition the rubber compound is formed by 45-85%, in particular 60-80% rubber and 55-15%, in particular 40-20% other materials. The Shore A is preferably 55-75. Compositions for the rubber compound are described for instance in WO 95/03984 and WO 93/22221. The compositions referred to in these publications can be used in combination with the present application, and the whole content of these publications is incorporated by way of reference into this application.

A rubber composition which can be used according to the invention is supplied under the brand name Cawiton (tm), in particular PR 7660. Cawiton is an SEBS composition with 30-60% SEBS and a similar amount of mineral oils, and supplemented with polyolefin. Cawiton has a Shore A of 57-63.

It is a further advantage that the piping bag according to the invention has a plastic foil which incorporates a polyolefin, in particular polyethylene or polypropylene. The piping bag according to the invention, in particular also the piping bag formed by co-extrusion, has at least two layers, in particular three layers and in a preferred embodiment (at least) four layers.

The outer layer gripped by the user is formed by the rubber composition. The inner layer which comes into contact with the foodstuffs is preferably a polyethylene, in particular LDPE, in the preferred embodiment linear LDPE. This polyethylene is smooth and very suitable for further processing techniques such as sealing.

In a particular application a three-layer piping bag is formed, wherein the middle layer comprises a polyolefin, in particular PE, LDPE or linear LDPE. The middle layer is particularly the carrier of the adjacent layers and functions as body, i.e. for strength and the like. The piping bag preferably comprises a first foil material part and a second foil material part, these parts being connected to each other by means of a melted join. In one embodiment an HDPE is used for or in one of the layers, preferably in the middle layer.

A second middle layer can be formed by a metalocene. This brings extra strength. This is preferably the outer middle layer. In one embodiment a part of the middle layer forms the outer layer on which no rubber composition is arranged.

In another embodiment the piping bag is provided with an anti-slip layer. The anti-slip layer is preferably formed by making use of the rubber composition. The anti-slip layer preferably comprises a pattern of dots arranged on the foil material.

The dots are preferably formed by a plastic material and have a diameter of 0.1 mm to 2 mm, preferably from 0.5 mm to 1.0 mm. It is favourable to fuse the dots of plastic material onto the foil material, preferably making use of the hot-melt technique.

A plastic band is preferably arranged around the dispensing opening for the purpose of forming a nozzle. The plastic band is preferably fused onto the bag around the dispensing opening.

The piping bag according to the invention substantially takes the form of a truncated triangle shape. Such piping bags are in general use.

According to a second aspect, the invention also relates to a method for manufacturing a piping bag. The method according to the invention comprises of forming the piping bag from at least one plastic and one rubber composition, wherein the rubber composition forms an outer side of the piping bag. The rubber composition considerably increases the grip on the piping bag in surprising manner. In addition, such a rubber composition has particular advantages in the food industry and displays some absorption of fats, whereby the grip is also retained under working conditions.

The forming according to the invention preferably comprises of forming the piping bag by co-extrusion of a plastic and a rubber composition. The material for the piping bag is obtained in one operating step by co-extrusion. This material can be further treated, for instance sealed, folded, punched, cut and/or wound onto a roll, whereby the piping bags are finally formed. Due to the co-extrusion an intimate connection is formed between the plastic, preferably a polyolefin, in particular a low-density polyethylene, and the rubber composition.

The method of extrusion comprises of providing granulates for the respective components (also the rubber composition), in particular the layers of the piping bag to be formed. The granulates are placed in the funnels of the extruders. Each extruder has its own granulate with its specific properties. The use of a number of extruders hereby creates a foil with a number of layers, with a different material in each layer. According to the invention two, three or four extruders are used to form a foil with two, three or four layers. The granulate is heated per extruder. The temperature is set in accordance with the properties of the granulate. The granulate becomes liquid through heating. The materials in liquid form then come together in a mould as one substance by means of spirally running channels. The substance is cured by means of air cooling as soon as the substance leaves the mould. The plastic foil is hereby formed. The foil material, a strip of a number of layers, is further processed by means of a roller path and the like. In the further processing the foil material is further treated and the piping bag properties further formed. The truncated pyramid form is obtained particularly by punching or sealing.

In addition, an anti-slip layer can be arranged on the foil material in the further processing. In another embodiment the rubber composition is only arranged on the formed foil after the extrusion and during the further processing, in particular after the punching and sealing of the piping bag. An extra module is then included in the processing unit for the foil material. The extra module is adapted to arrange the rubber composition on the plastic foil. A dot pattern of the rubber composition can particularly be arranged on the foil. In one embodiment the rubber composition can be applied by lamination to the outer side of the piping bag.

The rubber composition used in the method is preferably an apolar thermoplastic elastomer. Such an elastomer can be used in the co-extrusion with the apolar polyolefin.

According to a third aspect, the invention also relates to the use of a piping bag in the preparation of foodstuffs. The used piping bag is for instance embodied in accordance with one of the above stated measures.

Figure 2A:
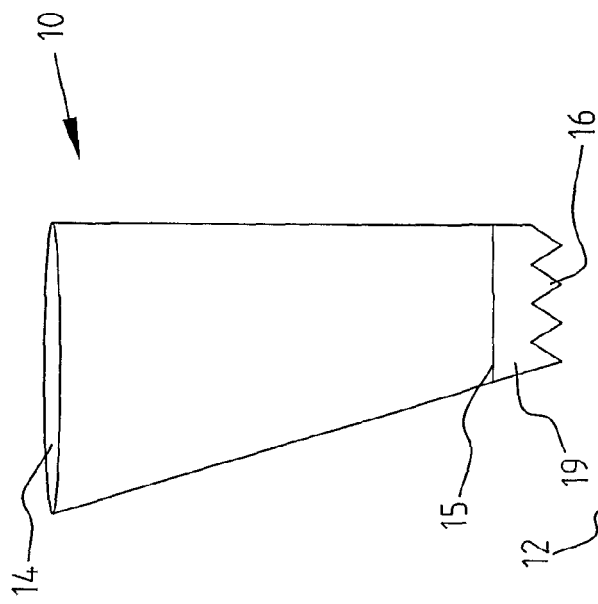
Figure 2B:
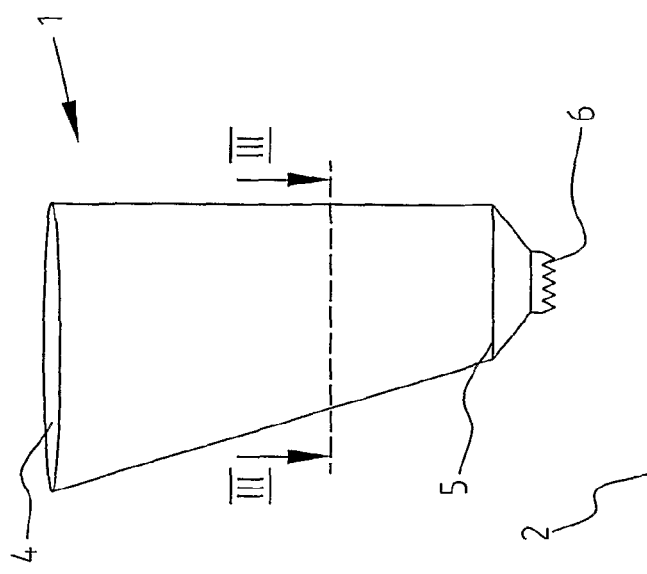
Figure 3:
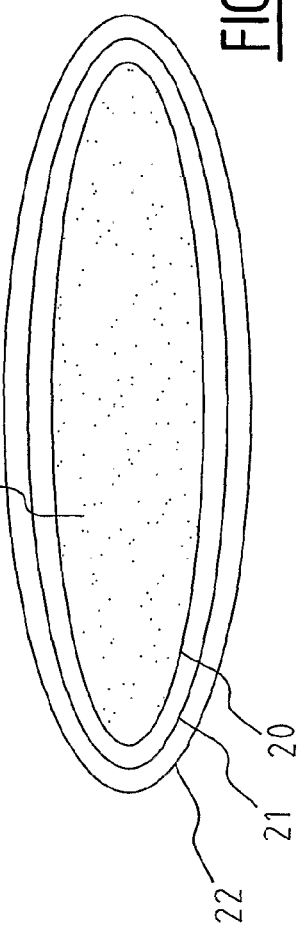

The invention will now be further described on the basis of exemplary embodiments shown in the accompanying figures, in which FIG. 1 shows a view of a device used to perform the method according to the invention, FIGS. 2A and 2B show a view of two embodiments of a piping bag according to the invention, FIG. 3 shows a cross-sectional view of the piping bag according to the invention.

FIG. 1 shows a schematic view of a device for manufacturing a reel 130 with piping bags. In this embodiment three granulates 101, 102 and 103, respectively an LLDPE, LLDPE and SEBS composition, are carried into a co-extrusion unit 100. The granulates are heated. The inlet is connected to the extruder.

The granulate is heated per extruder. The temperature is set to the temperature intended for the material. The granulate becomes liquid due to heating. A number of temperature zones, for instance five, can be set in the extruder. The temperatures for the different granulates can differ. The temperature zones also have different temperatures, for instance in the range of 120-240° C.

During the extrusion of the rubber composition the pressure development in the extruder is set in one embodiment by changing temperature settings on the extruder or by the use of a different type of screw, for instance a backflow screw, or screen for the extruder. A plurality of screens can be used, for instance three. The setting of the screw speed also affects the frictional heat created and the process of the flow. The correct flow of the end product is obtained by a combination of these settings.

Via the extruder the materials in liquid form come together in a mould as one substance by means of spirally running channels. The substance will leave the mould in cured form due to air cooling, for instance with a power of 160 W, and the plastic foil is formed.

In order to obtain equal thickness of the tubular foil over the whole periphery adjustments are made to the air ring through which the cooling air is dosed. Locations on the foil which are too thick and too thin can hereby be specifically dealt with and improved.

Following extrusion the foil is guided over roller 111 and carried to the foil magazine 112. Here the foil is pulled over a number of rollers, wherein the strip tension of the foil can be controlled.

The schematic drawing shows a top view of the foil from 114. A first perforation device 118 arranges a perforation 119 in a width direction of foil 114.

A second sealing device 120 placed at an angle to the direction of transport 116 arranges a seal 122 obliquely of the direction of transport.

Using perforation device 123 an oblique perforation is arranged over seal 122, along which perforation the formed bags can be torn from each other.

The formed bags 128,129 have a substantially triangular form and are mutually connected along the formed tear-off edges.

Other additional modules for further processing can be included in the process sequence as shown. A module for arranging an anti-slip layer can particularly be used. As addition to the rubber composition for the outer side of the piping bag, an anti-slip layer in the form of a dotted pattern can be arranged on the outer side.

In another embodiment a two-layer foil is produced, wherein the outer layer has a rubber composition.

In yet another embodiment a foil with one, two, three, four or more layers is produced during the extrusion without the rubber composition being arranged on the outer side of the piping bag during the co-extrusion. The rubber composition is then applied in the form of a coating, in particular as an anti-slip layer, to the outer side of the formed conical bag by means of an additional module in the further processing, for instance after the above described cutting and punching.

In the shown embodiment the processed foil for piping bags is then transported further over a second tensioning unit 125 and wound around a reel 130 so that a supply of triangular piping bags 128,129 is obtained. These can be easily transported to for instance a bakery. Here the baker can fit an associated nozzle to the tip of the triangular form, whereby the piping bags according to FIGS. 2A and 2B are obtained.

FIG. 2A shows a first embodiment of piping bag 1. Piping bag 1 is used to apply a foodstuff, for instance whipped cream, to a substrate 2. The piping bag comprises a plastic foil material. The piping bag has the form of a trapezium (truncated triangle). Outer end 4 is the inlet opening of the bag into which the foodstuff can be carried. Via the spout 6 close to the other end 5 the foodstuff can be applied to substrate 2. The user can herein deform the piping bag by pressing the bag from outer end 4 which is closed during use, for instance sealed or knotted. Through the pressing the volume of piping bag 1 is reduced, whereby the content will leave the bag via piping part 6.

Piping bag 10 has a similar form but is provided with a different nozzle 19, with opening 16, which is arranged on outer end 15 of the piping bag, for instance by fusing the spout to the bag. Piping bag 10 can be filled via opening 14 and the filling can be applied to substrate 12 via opening 16.

FIG. 3 shows a part of a cross-section of piping bag 1 along the line III-III in FIG. 2A. The figure is not to scale. The thickness of the layers is shown enlarged for the purpose of clarification. Shown is the three-layer structure of this embodiment of the piping bag according to the invention. An inner layer 20 of the piping bag, for instance a polyolefin such as an LDPE or linear LDPE, is in contact with filling 18 of the piping bag. The material of the inner layer is smooth and is approved for contact with foodstuffs. The inner layer has thickness of between 20 and 50 micron.

The middle layer 21 is formed during co-extrusion between inner layer 20 and outer layer 22. The middle layer has a supporting function and a strength function. Suitable materials are polyolefins, in particular LDPEs. The middle layer has thickness between 20 and 50 micron.

Outer layer 22 comes particularly into contact with ambient material, in particular with fatty substances, condensation or moisture, in particular moisture from the user him/herself, for instance generated via the hand of the user. The user does however want to be able to grasp the piping bag with sufficient grip for correct operation thereof during applying of the content 18 to a substrate 2. The outer layer 22, particularly formed by co-extrusion but optionally applied as fully encasing coating, or in another embodiment applied locally for instance in the form of an anti-slip layer, in particular in the form of pattern, is made up of a rubber-containing composition or rubber compound incorporating at least 15-75% rubber, in particular a thermoplastic elastomer. Such a substance provides considerably greater advantages for use in a piping bag than the prior art material. The outer layer has a thickness of about 15 micron.

Although the invention has been described with reference to the exemplary embodiments as shown in the drawings, it will be apparent to the skilled person that the invention is not limited to that which is shown, but that many different variants are possible within the concept of the invention as stated in the claims.

The invention claimed is:

1. A piping bag, comprising:
a bag body comprised of an outer layer and an inner layer mutually connected by co-extrusion, said inner layer comprised of a polyolefin and said outer layer comprised of a thermoplastic elastomer;
a filling opening formed by the bag body;
a dispensing end opposite the filling opening;
wherein said outer layer is comprised of an elastomer having a density in a range of 0.87 gr/cm³ to 1.15 gr/cm³ and a Shore A hardness of 55 to 75, the elastomer chosen from the group consisting of thermoplastic vulcanizates (TPV) and thermoplastic olefins (TPO).

2. The piping bag of claim 1, wherein said outer layer is comprised of an elastomer chosen from the group consisting of styrene-ethylene/butylene-styrene (SEBS), styrene-ethylene/propylene-styrene, styrene butylene styrene (SBS), and styrene isopropylene styrene (SIS).

3. The piping bag of claim 1, wherein the thermoplastic elastomer is an apolar thermoplastic elastomer.

4. A piping bag for applying a foodstuff to a substrate, comprising:
a tubular bag of polymeric foil material with an inner layer and an outer layer, the bag comprising a filling opening and a dispensing end, wherein a portion of the outer layer of the tubular bag comprises a rubber composition located to improve grip for a user of the piping bag during application of foodstuff to a substrate;
wherein the rubber composition is fixedly connected to the polymeric foil material by means of co-extrusion during the formation of the tubular bag;
wherein the rubber composition comprises a thermoplastic elastomer selected from the group consisting of styrene-based elastomers, thermoplastic vulcanizate elastomers (TPVs), and thermoplastic polyolefin elastomers (TPOs); and
wherein the rubber composition has a density of 0.85-1.25 g/cm³ and a Shore A hardness of 45 to 95.

5. The piping bag as claimed in claim 4, wherein the rubber composition has a density of 0.87-1.15 g/cm³.

6. The piping bag as claimed in claim 4, wherein the rubber composition has a density of 0.88-1.00 g/cm³.

7. The piping bag as claimed in claim 4, wherein the rubber composition has a Shore A hardness of 55 to 75.

8. The piping bag as claimed in claim 4, wherein the rubber composition is selected from the group consisting of styrene-ethylene/butylene-styrene (SEBS), styrene-ethylene/propylene-styrene, styrene butylene styrene (SBS), and styrene isopropylene styrene (SIS).

9. The piping bag as claimed in claim 4, wherein the rubber composition further comprises a polyolefin.

10. A piping bag for applying a foodstuff to a substrate, comprising:
a tubular bag of polymeric foil material with an inner layer and an outer layer, the bag comprising a filling opening and a dispensing end, wherein a portion of the outer layer of the tubular bag comprises a rubber composition located to improve grip for a user of the piping bag during application of foodstuff to a substrate;
wherein the rubber composition is fixedly connected to the polymeric foil material by means of co-extrusion during the formation of the tubular bag;
wherein the rubber composition comprises a thermoplastic elastomer selected from the group consisting of styrene-based elastomers, thermoplastic vulcanizate elastomers (TPVs), and thermoplastic polyolefin elastomers (TPOs);
wherein the rubber composition has a density of 0.88-1.00 g/cm³ and a Shore A hardness of 55 to 75; and
wherein the rubber composition is selected from the group consisting of styrene-ethylene/butylene-styrene (SEBS), styrene-ethylene/propylene-styrene, styrene butylene styrene (SBS), and styrene isopropylene styrene (SIS).

* * * * *